Patented Nov. 29, 1927.

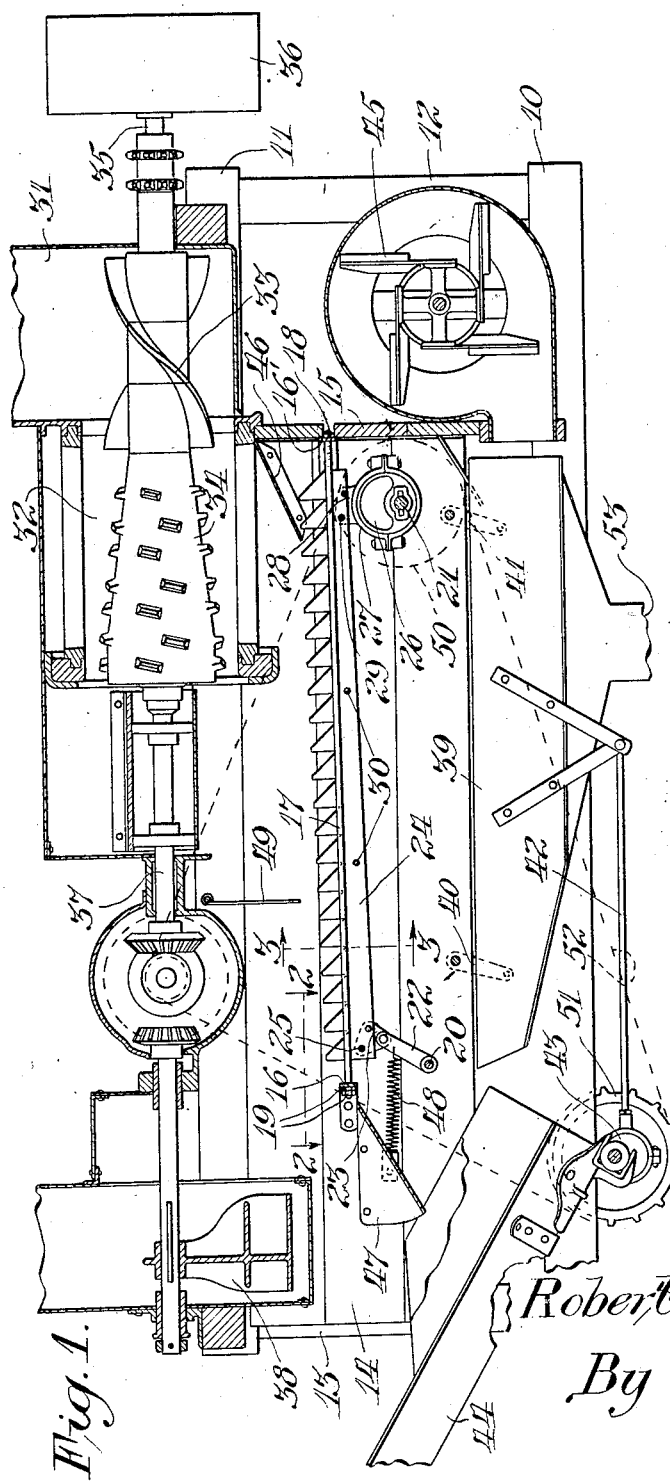

1,651,037

UNITED STATES PATENT OFFICE.

ROBERT M. MITCHELL, OF CHICAGO, ILLINOIS, ASSIGNOR TO INTERNATIONAL HARVESTER COMPANY, OF CHICAGO, ILLINOIS, A CORPORATION OF NEW JERSEY.

SEPARATING MECHANISM FOR CORN SHELLERS AND THE LIKE.

Application filed March 8, 1924. Serial No. 697,710.

This invention relates to a separating mechanism such as is used in corn shellers or grain separating machines.

The principal object of the invention is to provide a simply constructed mechanism which will effectually and economically separate the shelled corn from the husks and broken cobs, if used with corn shellers, and will separate the grain from chaff, straw and other matter, if used with grain separators.

Other objects of the invention should be apparent to those skilled in the art to which this invention relates as the description thereof progresses.

The preferred embodiment of the invention is illustrated in the accompanying sheet of drawings, in which—

Fig. 1 is a side elevational view partly in section of a corn sheller showing the improved separating mechanism and its relation to the various parts of the machine;

Fig. 2 is a plan view taken substantially along the line 2—2 of Fig. 1 and shows one end of the improved separating mechanism;

Fig. 3 is a detail sectional view of the separating mechanism taken substantially along the line 3—3 of Fig. 1 and looking in the direction of the arrows.

The corn sheller illustrated is of the power operated type mounted on a truck frame (not shown), and comprises horizontal frame members 10 and 11 and vertical supporting posts 12 and 13. That part of the machine which houses the separating mechanism is enclosed by side boards 14 and similar end boards 15, the side boards nearest the observer not being shown in Fig. 1, for the purpose of clearness in illustration.

Supported adjacent one end of the machine by the side boards 14 is a transverse bracket 16 having a series of uniformly spaced apertures which receive a series of rigid, spaced rods 17. These rods extend longitudinally in a horizontal plane to the opposite end of the machine where they are fixed by suitable bolts 18 to another bracket 16' also carried by the side boards 14. The ends of the rods carried in the brackets 16 protrude slightly therebeyond and are screw threaded to receive nuts and lock nuts 19 which fixedly secure these rods in position against displacement. Disposed beneath these longitudinal rods and carried by the side boards of the machine is a pair of transversely arranged shafts 20 and 21. The shaft 20 is fixed and is carried adjacent the discharge end of the separating mechanism of which the longitudinal, rigid bars described form a part. Adjacent each end of this shaft 20 and pivoted thereto is a link or crank 22, only one of which is shown. The opposite end of this crank is pivoted to a casting 23 which carries two of a plurality of movable members 24 arranged between the longitudinal rods 17. At the discharge end of the separating mechanism these movable members 24 are interconnected by means of a rod 25.

The shaft 21 at the opposite end of the separating mechanism, or the charging end thereof, is rotatable and carries at its opposite ends an eccentrically arranged disk 26 fixed to the shaft, which is adapted to rotate within a concentric split ring 27 carrying a casting 28 connected to the opposite end of one of the movable members 24. At this end of the separator these movable members are tied together by means of a rod 29 similar to the rod 25 heretofore described. It will thus be appreciated that as rotation is imparted to the shaft 21 the eccentric will rotate within the concentric member and through the connecting casting 28, impart to the charging end of the movable members a reciprocatory movement. Furthermore, because of the connecting rods 25 and 29, these movable members will move constantly together as a unitary structure, the rear end rising and falling in an orbital path between the longitudinal rods 17. For the purpose of imparting greater rigidity to these movable members transverse tie rods 30, similar to the rods 29 and 25, may be provided if desired.

Positioned above the charging end of the separating mechanism and supported by the upper frame members 11 is the usual hopper 31 and shelling chamber 32 where the corn cobs are fed into the machine and are broken, husked and shelled. Disposed in the hopper and the shelling chamber is the breaking member 33 and shelling member 34 fastened to a shaft 35 adapted to be driven from a pulley 36, which may be connected by a belt to any suitable source of power. Through the medium of suitable gearing 37 this same shaft is adapted to drive a suction fan 38 carried at the opposite end of the machine. Disposed below the separating mechanism is the usual grain shoe or riddle 39 hinged to the side boards by links 40 and 41, which is adapted to be vibrated to and fro by means of a pitman 42 operable from an eccentric 43 similar in construction to the eccentric mechanism previously described. Carried in suitable brackets by the frame of the machine at the discharge end of the separating mechanism is a cob elevator 44. At the opposite end of the machine and mounted in a suitable housing is a blower 45 adapted to direct a blast of air through the grain shoe 39. Below the shelling chamber 32 is an inclined pan 46 which functions to direct the material from the shelling chamber onto the charging end of the separating mechanism. Carried by the side boards of the machine at the discharged end of the separating mechanism is a spout or chute 47 which directs cobs to the cob elevator 44.

To assist in advancing the material on the separator from the charging end to the discharge end, the movable members are provided with teeth or fish backs, as shown. To expedite the advance of the material by these fish back movable members along the longitudinal rods, the cranks 22, only one of which is shown as heretofore stated, have fastened thereto a spring 48, the opposite ends of these springs being fastened to the side boards of the machine. It will thus be seen that, as the eccentric 26 imparts a raising and falling orbital movement to the charging end of the movable members, at the same time the cranks 22 will be oscillated. As the eccentric 26 rotates the springs 48 will be extended when the eccentric is moving from its extreme downmost position to its extreme position to the right (when viewed in the drawings). As the eccentric continues to rotate beyond this point, the springs 48 will exert a sudden pull on the cranks 22 and impart an impulse to the movable members, which in turn will give a sudden kick, thereby advancing the material along the longitudinal rods 17. This kicking action will occur once on every rotation of the eccentric and is thus intermittent in action, as is quite evident. This accelerated motion or impulse is possible because of the construction of the eccentric; that is, the slidable relation of the eccentric 26 with respect to the concentric rings 27. Lest this kicking action move the material too far, the frame of the machine carries a transversely arranged hinged guard 49 which prevents this tendency incident to the kicking action just described. The shaft 21 is rotated by a sprocket wheel 50, which it carries and which is connected to another sprocket wheel 51 by means of a chain 52 for operating the eccentric 43, and in turn connected to the main drive shaft 35 by the same chain.

The operation of the machine will be quite evident from the above detailed description, nevertheless, it will be briefly described.

The cobs of corn are elevated by any suitable means to the hopper 31 where they are forced into shelling chamber 32 by feed spiral element 33, and husked and shelled by the member 34, the cobs, husks and kernels then dropping onto the charging end of the separating mechanism. The reciprocatory movement of the fish back movable members then advances this material along the longitudinal rods, the kernels falling through the rods between the fish backs onto the riddle or grain shoe 39, while the cobs drop onto the chute 47 and are elevated out of the machine by the cob elevator 44. At the same time a blast of air is directed from the blower 45 through the grain shoe to clean the kernels of dust and chaff. The suction fan 38 sucks the husks from the separating mechanism. The shelled corn falls through the riddle or shoe and is received at the discharge opening 53.

While there has been shown the preferred form of the invention, it is to be understood that various changes in the form and construction and arrangement of parts may be made by those skilled in the art without departing from the spirit of the invention as claimed.

Having thus described the invention, what I claim and desire to secure by Letters Patent is:

1. In a machine of the class described, the combination of a frame having end pieces, separating mechanism carried by the frame comprising a series of spaced rods detachably fitted into the end pieces of the frame, movable members disposed between the rods, said members substantially filling the spaces between the rods, means for reciprocating the movable members together as a unit in an orbital path between the rods, and means for imparting to the members an intermittent kicking action whereby material on the separator is advanced from one end of the rods to the other.

2. In a machine of the class described, the combination of a frame, end pieces carried in the frame, separating mechanism adapted to receive mixed materials, said mechanism including a series of spaced bars having their ends attached to said end pieces, members between the rods, eccentrically operated means supporting the movable members at one end and imparting a reciprocatory orbital movement thereto, pivoted means supporting the members at their opposite ends, and resilient means carried by the frame and connected to the pivoted means for imparting an intermittent kicking action to the members, whereby part of the materials on the separator are moved therealong from one end to the other, while the remainder of the materials drops between the rods to be separated.

3. In a machine of the class described, the combination of a frame having end pieces, separating mechanism carried by the frame comprising a series of spaced rods detachably fitted into the end pieces of the frame, movable members disposed between the rods for moving material therealong, said members substantially filling the spaces between the rods, means for imparting a reciprocatory kicking motion to the members, and means carried by the frame and disposed above the members adjacent one end for preventing the material from being kicked too far.

4. In a machine of the class described, the combination of a frame having end pieces, separating mechanism carried by the frame comprising a series of spaced rods detachably fitted into the end pieces of the frame, movable members disposed between the rods, said members substantially filling the spaces between the rods, means for reciprocating the movable members in an orbital path and together as a unit, means for imparting to the members an intermittent kicking action whereby material on the separator is advanced from one end of the rods to the other, and a pivoted depending shield carried by the frame above said movable members for preventing the material from being kicked too far.

In testimony whereof I affix my signature.

ROBERT M. MITCHELL.